(12) United States Patent
Azegami

(10) Patent No.: US 8,690,492 B2
(45) Date of Patent: Apr. 8, 2014

(54) BALL END MILL

(75) Inventor: Takayuki Azegami, Akashi (JP)

(73) Assignee: Mitsubishi Materials Corporation, Tokyo (JP)

( * ) Notice: Subject to any disclaimer, the term of this patent is extended or adjusted under 35 U.S.C. 154(b) by 54 days.

(21) Appl. No.: 13/395,726

(22) PCT Filed: Sep. 10, 2010

(86) PCT No.: PCT/JP2010/065624
§ 371 (c)(1),
(2), (4) Date: Mar. 13, 2012

(87) PCT Pub. No.: WO2011/030854
PCT Pub. Date: Mar. 17, 2011

(65) Prior Publication Data
US 2012/0170984 A1    Jul. 5, 2012

(30) Foreign Application Priority Data

Sep. 14, 2009    (JP) .................. 2009-212128

(51) Int. Cl.
*B23C 5/10* (2006.01)
*B23C 5/00* (2006.01)

(52) U.S. Cl.
USPC .................. 407/53; 407/54; 407/59

(58) Field of Classification Search
USPC ............ 407/53, 54, 56, 57, 60, 61, 62, 5, 629
See application file for complete search history.

(56) References Cited

U.S. PATENT DOCUMENTS

| | | | | |
|---|---|---|---|---|
| 4,963,059 A | * | 10/1990 | Hiyama | 407/60 |
| 6,991,409 B2 | * | 1/2006 | Noland | 407/63 |
| 7,306,408 B2 | * | 12/2007 | Wells et al. | 407/53 |
| 7,563,059 B2 | * | 7/2009 | Song | 407/53 |
| 7,789,597 B2 | * | 9/2010 | Wells et al. | 407/53 |
| 2004/0120777 A1 | | 6/2004 | Noland | |

FOREIGN PATENT DOCUMENTS

| | | |
|---|---|---|
| DE | 3706282 A1 | 9/1987 |
| JP | 62-203710 A | 9/1987 |
| JP | 63-74213 U | 5/1988 |
| JP | 02-114417 U | 9/1990 |

(Continued)

OTHER PUBLICATIONS

Japanese Office Action mailed on Aug. 6, 2013, for corresponding Japanese Patent Application No. 2009-212128.

(Continued)

*Primary Examiner* — Will Fridie, Jr.
(74) *Attorney, Agent, or Firm* — Edwards Wildman Palmer LLP

(57) ABSTRACT

In the tip section of an end mill body, a plurality of end cutting edges are formed. In the outer peripheral section of the end mill body, a plurality of peripheral cutting edges are formed. Some of the plurality of end cutting edges are long end cutting edges. The angle which is formed by the straight line that connects the axis to a peripheral cutting edge continuous with a long end cutting edge and by the straight line that connects the axis to a peripheral cutting edge continuous with the end cutting edge positioned in forward of the long end cutting edge in the end mill rotation direction, is larger than the angle which is formed by the tangent lines at the inner ends of the long end cutting edge and the end cutting edge positioned in forward of the long end cutting edge in the end mill rotation direction.

6 Claims, 2 Drawing Sheets

(56) References Cited

FOREIGN PATENT DOCUMENTS

| JP | 02-256412 A | | 10/1990 |
|---|---|---|---|
| JP | 2006-224254 A | | 8/2006 |
| JP | 2006224254 A | * | 8/2006 |
| WO | WO-2007/098194 A2 | | 8/2007 |

OTHER PUBLICATIONS

International Search Report dated Nov. 16, 2010, issued for PCT/JP2010/065624.
Search Report dated Mar. 8, 2013, issued for the European patent application No. 10815448.5.

* cited by examiner

BALL END MILL

TECHNICAL FIELD

Priority is claimed on Japanese Patent Application No. 2009-212128, filed Sep. 14, 2009, the contents of which are incorporated herein by reference.

The present invention relates to a ball end mill in which a plurality of end cutting edges whose rotational trajectory around an axis is hemispherical are formed at unequal intervals in a circumferential direction at a tip section of an end mill body which rotates around this axis.

TECHNICAL BACKGROUND

As an example of a ball end mill in which the cutting edges are formed at unequal intervals in the circumferential direction, a ball end mill in which, of a plurality of peripheral cutting edges which are formed on the outer circumference of the end mill body, at least one peripheral cutting edge has a helix angle which is different from that of the other peripheral cutting edges, and in which an end cutting edge having, as its rotational trajectory, a hemisphere shape, and having a circular arc-shaped, is formed at the tip of this peripheral cutting edge has been proposed in Patent document 1. In addition, a ball end mill in which, when the point of the ball end mill is viewed from the axial direction, the plurality of end cutting edges are seen to form protruding curves that each have a mutually different radius of curvature and that are formed at unequal intervals in the circumferential direction has been proposed in Patent document 2.

In a ball end mill in which the intervals in a circumferential direction between peripheral cutting edges and end cutting edges are formed unequally in this manner, the periods at which these cutting edges bite into a work piece are non-constant, and the vibrations created by such biting actions cancel each other out. As a result, it is possible to prevent resonance that harms the precision of the finished surface (i.e., what is known as 'chattering vibration') from occurring.

DOCUMENTS OF THE PRIOR ART

Patent Documents

[Patent document 1] Japanese Unexamined Patent Application, First Publication No. S62-203710
[Patent document 2] Japanese Unexamined Patent Application, First Publication No. 2006-224254

DISCLOSURE OF THE INVENTION

Problems to be Solved by the Invention

In these types of ball end mills, particularly in cases such as when there are four or more cutting edges, if the inside ends of all of the end cutting edges are placed in close proximity to the end mill rotation axis at the tip section of the end mill body, the grinding wheel which is used to form each end cutting edge interferes with the other end cutting edges. Consequently, this arrangement causes production problems. Because of this, if there are, for example, four end cutting edges, two of the end cutting edges are formed into long end cutting edges that extend out from the vicinity of the axis of the tip section of the end mill body, while the other two end cutting edges are formed into short end cutting edges whose inside ends extend outwards from a position which is further from the axis than that of the long end cutting edges, and these long end cutting edges and short end cutting edges are placed alternately in a circumferential direction.

Accordingly, in a long end cutting edge, because the length of the cutting edge facing the vicinity of the axis is longer than that of a short end cutting edge, the long end cutting edge generate a greater quantity of chips. Moreover, because the width and depth of the gash decreases in the vicinity of the axis, it is not possible to enlarge the pocket that discharges the chips. Consequently, the generated chips are moved in a compressed state towards the outer circumference of the rear end of the end mill body. Furthermore, the chips are discharged via chip discharge grooves which are positioned further in forward in the rotation direction of the end mill than the peripheral cutting edges that are formed on outer circumferential portions of the end mill body.

However, if the helix angles of the peripheral cutting edges are different, as is the case in the ball end mill described in Patent document 1, in the case in which the helix angle of the peripheral cutting edges which are continuous with the outside ends of the long end cutting edges is smaller than that of the peripheral cutting edges which are positioned in forward in the rotation direction of the end mill, in the chip discharge grooves that are formed further forward in the rotation direction of the end mill than the peripheral cutting edges which are continuous with the long end cutting edges, the groove width becomes gradually narrower as it moves towards the rear end of the end mill. Because of this, the chips that have been compressed, as described above, and moved to the chip discharge grooves are compressed even further, and there is a possibility that the chips will build up and create blockages.

Moreover, in the ball end mill described in Patent document 2 as well, if, among the plurality of end cutting edges having different radii of curvature, the radius of curvature of the short end cutting edges is shorter relative to the radius of curvature of the long end cutting edges, the pockets that are formed forward of the long end cutting edges in the rotation direction of the end mill become gradually smaller as they move towards the outer circumference of the rear end of the end mill. Consequently, particularly in cutting of difficult-to-cut material that tends to generate chip jamming, the chip jamming tend to occur before the chips reach the chip discharge grooves in the outer circumferential portions of the end mill body.

Means for Solving the Problem

In the ball end mill of the present invention, a plurality of end cutting edges are formed on a tip section of an end mill body which is rotated around an axis. The plurality of end cutting edges are formed having, as its rotational trajectory, a hemisphere shape that is centered on the axis. The plurality of end cutting edges are formed in such a way that they extend from the inside of the point of the tip section at intervals in a circumferential direction to the outside of the rear end thereof. In addition, a plurality of peripheral cutting edges that are continuous with outside ends of the end cutting edges and that extend to the rear end are formed at intervals in the circumferential direction on an outer circumferential portion of the end mill body. A portion of the plurality of end cutting edges are formed into long end cutting edges that extend out from the vicinity of the axis at the tip section of the end mill body, and an angle which, on an cross-section perpendicular to the axis, is formed between two straight lines that connect the axis with two peripheral cutting edges which are continuous with the long end cutting edge and with an end cutting edge which is positioned in forward of the long end cutting edge in the end mill rotation direction is larger than an angle which, when viewed from the point in the direction of the axis, is formed between a tangent line at an inside end of the long end cutting edge, and a tangent line at an inside end of the end cutting edge which is positioned in forward of the long end cutting edge in the end mill rotation direction.

In particular, the ball end mill of the present invention is provided with an end mill body and a plurality of end cutting edges that are formed on a tip section of the end mill body, and that, when the end mill body is rotated around an axis of a longitudinal direction of the end mill body, are formed having, as its rotational trajectory around the axis, a hemisphere shape that is centered on the axis. The plurality of end cutting edges are formed at intervals in the circumferential direction of the end mill body, and are formed in such a way that they each extend from the inside of the point of the tip section to the outside of the rear end thereof. The ball end mill is further provided with a plurality of peripheral cutting edges that are formed at intervals in the circumferential direction of the end mill body on an outer circumferential portion of the end mill body. Each end cutting edge continues on from the outer ends of the plurality of end cutting edges and extends to the rear end of the end mill body.

Some of the end cutting edges from among the plurality of end cutting edges are longer than the other end cutting edges, and form long end cutting edges that extend from the vicinity of the axis at the tip section of the end mill body to the outside of the rear end thereof.

Furthermore, on an arbitrary cross-section perpendicular to the axis, an angle between a straight line that connects the axis to an peripheral cutting edge which is continuous with the long end cutting edge, and a straight line that connects the axis to an peripheral cutting edge which is continuous with the other end cutting edge which is positioned in forward of the long end cutting edge in the rotation direction of the end mill body is taken as a first angle, and, in a view from the point in the direction of the axis of the tip section, an angle between a tangent line at an inside end of the long end cutting edge, and a tangent line at an inside end of the other end cutting edge which is positioned in forward of the long end cutting edge in the rotation direction of the end mill body is taken as a second angle. At this time, the first angle is larger than the second angle.

In a ball end mill that is constructed in this manner, compared to the angle (i.e., the second angle) which, when viewed from the point in the axial direction, is formed between the tangent line at an inside end of the long end cutting edge and the tangent line at an inside end of the end cutting edge which is positioned in forward of this long end cutting edge in the end mill rotation direction, the angle (i.e., the first angle) which, on a cross-section perpendicular to the axis, is formed between the two straight lines that connect the axis with the two peripheral cutting edges which are continuous with these end cutting edges is larger. Because of this, the pockets and the chip discharge grooves that are formed forward of the peripheral cutting edges which are continuous with the long end cutting edges in the end mill rotation direction are possible to be made larger as they approach the peripheral cutting edges. As a result, chips that are created in areas adjacent to the inside ends of the long end cutting edges and that are in a compressed state can also be smoothly discharged towards the outer circumference of the rear end of the long end cutting edges and can be smoothly discharged to the chip discharge grooves.

Furthermore, in order to make the included angle between the two peripheral cutting edges larger than the included angle between a long end cutting edge and the inside end portion of the end cutting edge which is formed forward of the long end cutting edge in the rotation direction of the end mill, it is also possible for a helix angle of the long end cutting edge relative to the axis to be larger than a helix angle of the end cutting edge that is positioned in forward of the long end cutting edge in the end mill rotation direction relative to the axis. By doing this, because, when viewed from the point in the axial direction of the tip section, the included angle between the tangent lines of these end cutting edges at each position in the axial direction becomes gradually larger as the included angle moves towards the peripheral cutting edges, it is possible for chips to be smoothly discharged. Moreover, if the helix angle of the long end cutting edges is made different from the helix angle of the end cutting edges that are positioned in forward of the long end cutting edges in the rotation direction of the end mill, the orientation and amount of the resistance and load when these end cutting edges bite into a work piece, and also the cycle of such cutting are mutually different. As a result, these can be made to cancel each other out, and it is also possible to prevent chatter vibration from being generated.

Moreover, it is also possible for the inside ends of those end cutting edges, which are from among the plurality of end cutting edges that are positioned in forward of the long end cutting edges in the end mill rotation direction, to be located further from the axis than the inside ends of the long end cutting edges, and it is possible for these end cutting edges to form short end cutting edges that extend from these positions to the rear end of the end mill body. By doing this, when viewed from the point in the axial direction, the angle between the tangent line at the inside end of the short end cutting edges and the tangent line at the inside end of the long end cutting edge that is positioned in backward of the short end cutting edge in the rotation direction of the end mill is smaller than the angle which, in the cross section perpendicular to the axis, is formed between the peripheral cutting edges which are continuous with the long end cutting edge and the short end cutting edge. Because of this, it is possible to make shorten the interval when biting into a work piece by the short end cutting edge and when biting into the work piece by the long end cutting edge. As a result, as described above, it is possible to achieve uniformities in the quantity of chips produced, in the size of the chips, and even in the cutting resistance received by the end cutting edges in both the long end cutting edges that have a long end cutting edge length and create a greater quantity of chips, and the short end cutting edges that have a short end cutting edge length and create a comparatively smaller quantity of chips. As a result, it is possible to uniformize the life spans of all the end cutting edges, and thereby achieve a prolonging of the life span of the end mill.

Effects of the Invention

As described above, according to the present invention, chips that are created in a compressed state particularly in an inside end of a long end cutting edge are smoothly discharged from the outside at the rear end of the long end cutting edge towards a chip discharge groove in an peripheral cutting edge which is continuous with this long end cutting edge. As a consequence, chip jamming is prevented even in cutting of difficult-to-cut material, and any increase in the resistance and load during a cutting process are suppressed. As a result, efficient cutting processing becomes possible.

BEST EMBODIMENTS FOR IMPLEMENTING THE INVENTION

Figure 1:
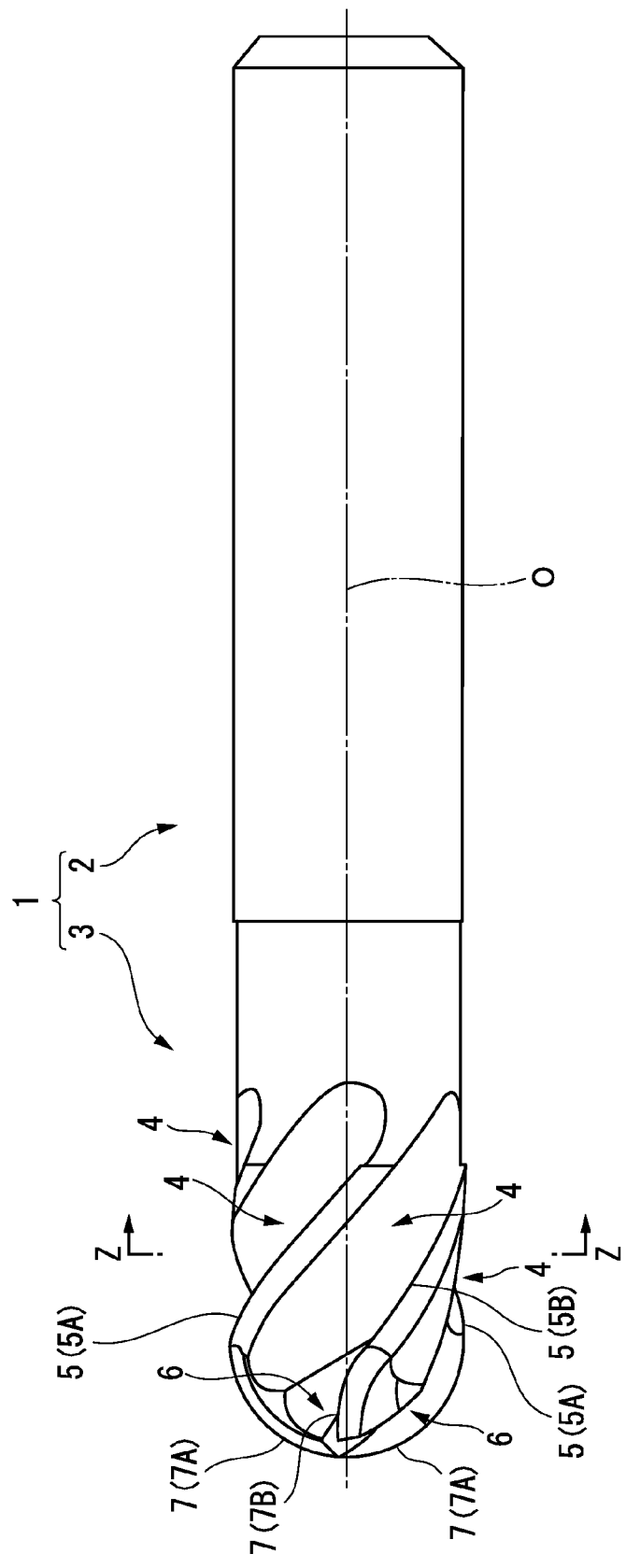
FIG. 1 is a side view showing an embodiment of the present invention.
Figure 2A:
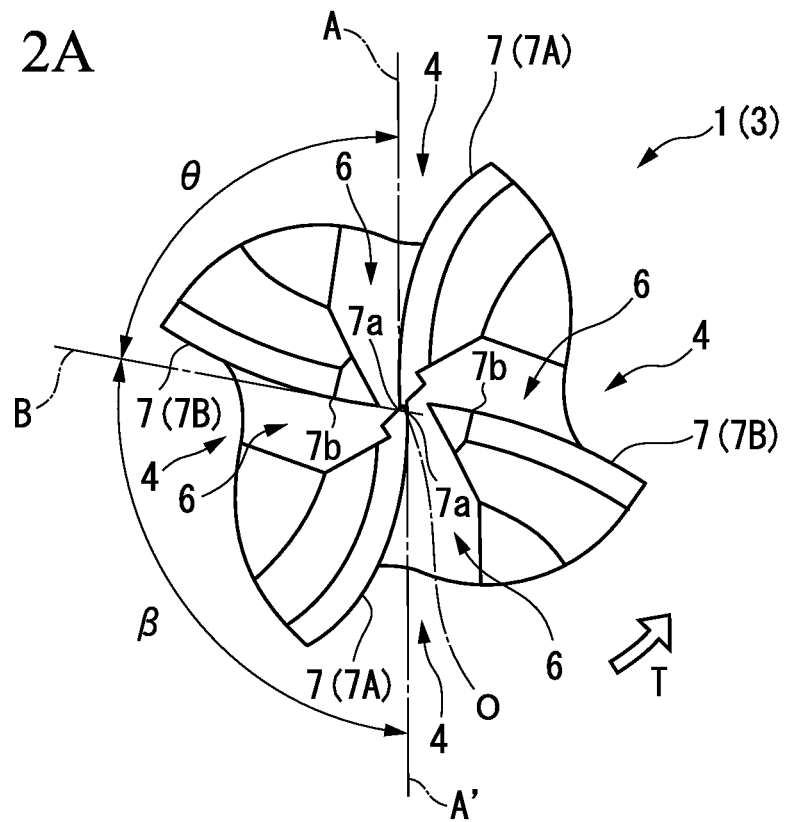
FIG. 2A is a front view as seen from the point in the direction of an axis O of the end mill body shown in FIG. 1.
Figure 2B:
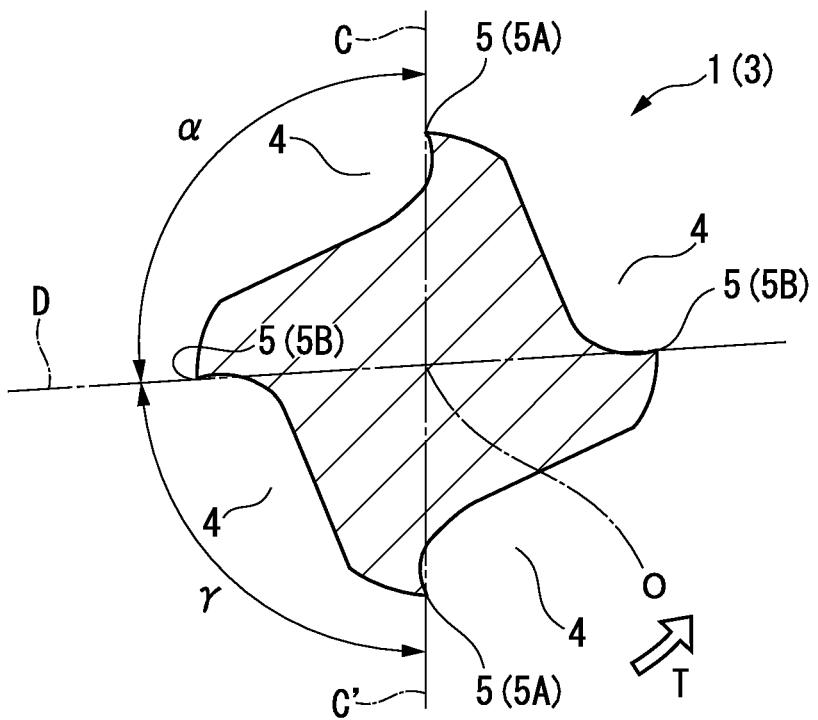
FIG. 2B is a cross-sectional view as seen from a line Z-Z in FIG. 1 which shows the end mill body.

In an embodiment of the present invention that is shown in FIG. 1 and FIGS. 2A and 2B, an end mill body 1 has a substantially circular column shape which is centered on an axis O. A shank portion 2 is formed on a rear end (i.e., on the right-hand side in FIG. 1) of the end mill body 1, and a cutting edge portion 3 is formed on a tip thereof. When the shank portion 2 is mounted on a spindle of a machine tool, the end mill body 1 is able to rotate in a rotation direction T around the axis O and is also able to be fed forward in a direction that intersects the axis O, and the end mill body 1 is able to thereby perform cutting work on a work piece by means of the cutting edge portion 3. Moreover, in some cases, the end mill body 1 may be fed in a direction that intersects the axis O, and at the same time the end mill body 1 may be fed in the direction of the axis O from the rear end of the end mill body 1 towards the front end thereof, so as to thereby perform cutting work on a work piece in the same way.

In a peripheral of the cutting edge portion 3, a plurality (four in the present embodiment) of chip discharge grooves 4 that spiral towards backward of an end mill rotation direction T as they move towards the rear end are formed extending from the tip of the end mill body 1 towards the rear end thereof. Furthermore, peripheral cutting edges 5 that create a single cylindrical surface whose rotational trajectory around the axis O is centered on the axis O are formed respectively, on lateral edge portions on the outer side of the wall surfaces of these chip discharge grooves 4 that face forward in the end mill rotation direction T.

In the tip sections in each of the chip discharge grooves 4, gashes 6 are formed to be extended toward the tip of the end mill 1 and formed to be hollowed out such that the wall surfaces face forward in the end mill rotation direction T. Circular arc-shaped end cutting edges 7 that form protruding hemispherical surfaces whose rotational trajectories around the axis O are centered on the axis O are formed on the outer side lateral edge portions of the wall surfaces of the gashes 6 that face forward in the end mill rotation direction T. In particular, in the present embodiment, the four end cutting edges 7 are formed on the cutting edge portions 3 of the tip section of the end mill body 1, and the four peripheral cutting edges 5 that are continuous with the respective end cutting edges 7 are formed on the outer circumference of the tip section. The end cutting edges 7 also twist towards backward in the end mill rotation direction T as they move from the inner side (i.e., from the axis O) of the tip of the end mill body 1 towards the outer side of the rear end along the hemispherical surface and are smoothly connected to the points of the respective peripheral cutting edges 5.

In addition, some (two in the present embodiment) of the end cutting edges 7 from among the plurality of end cutting edges 7 are long end cutting edges 7A that extend from the vicinity of the axis O in the tip section of the end mill body 1 to the outer side of the rear end thereof. Here, on an arbitrary cross-section which is perpendicular to the axis O, particularly, when a cross-section of the end mill body 1 along a line Z-Z shown in FIG. 1 is viewed (see FIG. 2B), an angle (i.e., a first angle) between a straight line C that connects the axis O to an peripheral cutting edge 5A which is continuous with the long end cutting edge 7A and a straight line D that connects the axis O to an peripheral cutting edge 5B which is continuous with an short end cutting edge 7B which is positioned in forward of the long end cutting edge 7A in the end mill rotation direction T is taken as $\alpha$. In addition, in a view from the tip section in the direction of the axis O, that is, when the tip section of the end mill body 1 is viewed from the direction of the axis O (see FIG. 2A), an angle (i.e., a second angle) between a tangent line A at an inside end 7a of the long end cutting edge 7A and a tangent line B at an inside end 7b of the short end cutting edge 7B which is positioned in forward of the long end cutting edge 7A in the end mill rotation direction T is taken as $\theta$. Here, the angle $\alpha$ is larger than the angle $\theta$.

Here, in the present embodiment, of the four end cutting edges 7, one pair of the end cutting edges 7 that are positioned on opposite sides from each other across the axis O is the long end cutting edges 7A. The other pair of the end cutting edges 7 is the short end cutting edges 7B whose inside ends 7b are positioned further from the axis O than the inside ends 7a of the long end cutting edges 7A when viewed from the point in the direction of the axis O, and that extend from the position of the inside ends 7b towards the outer side of the rear end. These long end cutting edges 7A and short end cutting edges 7B are placed alternately in the circumferential direction. Each portion of the end mill body 1 including the long end cutting edges 7A, the peripheral cutting edges 5A that are continuous with the long end cutting edges 7A, the short end cutting edges 7B, and the peripheral cutting edges 5B that are continuous with the short end cutting edges 7B are formed rotationally symmetrically at 180° around the axis O.

Furthermore, in the present embodiment, in the case of the helix angle relative to the axis O of the end cutting edges 7 that twist towards backward in the end mill rotation direction T as they move towards the rear end of the end mill body 1, the helix angle relative to the axis O of the long end cutting edges 7A is larger than the helix angle relative to the axis O of the short end cutting edges 7B that are positioned in forward of the long end cutting edges 7A in the end mill rotation direction T. Consequently, the angle $\alpha$ between the straight line C and the straight line D is larger than the angle $\theta$ between the tangent line A and the tangent line B. Here, if the total number of the end cutting edges 7 and the peripheral cutting edges 5 formed in the end mill body 1 are taken as N, the angles $\theta$ and $\alpha$ are respectively to $\theta<360°/N$ and $\alpha>360°/N$. In the present embodiment, because N=4, therefore $\theta<90°$ and $\alpha>90°$. For example, in the present embodiment, $\theta=80°$ and $\alpha=95°$.

In the present embodiment, the total number N of the end cutting edges 7 and the peripheral cutting edges 5 is four, and each portion of the end mill body 1 is rotationally symmetrical at 180° around the axis O. In the present embodiment, when viewed from the point in the direction of the axis O (see FIG. 2A), the angle $\theta$ between the tangent line A at the inside end 7a of the long end cutting edge 7A and the tangent line B at the inside end 7b of the short end cutting edge 7B which is positioned in forward of the long end cutting edge 7A in the end mill rotation direction T is smaller than an angle $\beta$ between the tangent line B at an inside end of the short end cutting edge 7B and a tangent line A' at the inside end 7a of the other long end cutting edge 7A which is positioned in forward of the short end cutting edge 7B in the end mill rotation direction T. For example, in the present embodiment, $\beta=100°$.

In contrast, in the peripheral cutting edges 5, on a cross-section perpendicular to the axis O (see FIG. 2B), the angle a between the straight line C that connects the axis O to the peripheral cutting edge 5A which is continuous with the long end cutting edge 7A and the straight line D that connects the axis O to the peripheral cutting edge 5B which is continuous with the short end cutting edge 7B which is positioned in forward of the long end cutting edge 7A in the end mill rotation direction T is larger than an angle γ between the straight line D that connects the axis O to the peripheral cutting edge 5B which is continuous with the short end cutting edge 7B and a straight line C' that connects the axis O to the peripheral cutting edge 5A which is continuous with the other long end cutting edge 7A which is positioned in forward of the short end cutting edge 7B in the end mill rotation direction T. For example, in the present embodiment, γ=85°.

In particular, in the present embodiment, the size relationship between the angles θ and β is the inverse of the size relationship between the angles α and γ.

Pockets that are used to discharge chips and that include the gashes 6 and the chip discharge grooves 4 are formed in the above described ball end mill in forward of the long end cutting edges 7A and the peripheral cutting edges 5A which are continuous with the long end cutting edges 7A in the end mill rotation direction T. In the present embodiment, because the angle α is larger than the angle θ, the width in the circumferential direction of the chip discharge pockets that are formed by the gashes 6 and the chip discharge grooves 4 forward of the long end cutting edges 7A and the peripheral cutting edges 5A which are continuous with the long end cutting edges 7A in the end mill rotation direction T can be made wider as the pockets approach the peripheral cutting edge 5A.

Because of this, even if the chips that are created in the inside ends 7a of the long end cutting edges 7A and in areas adjacent thereto where the pockets are unavoidably reduced in size are compressed, and are fed from the gashes 6 towards the outer side of the rear end of the end mill body 1, the chips can still be smoothly discharged via the chip discharge grooves 4 in the peripheral cutting edges 5A where pockets that become larger in width as they approach the rear end have been provided. Moreover, even in cutting of difficult-to-cut material that tends to generate chip jamming, it is possible to prevent the compressed chips from generating blockages in the gashes 6 and chip discharge grooves 4, and consequently generating increases in the cutting resistance and the load. As a result, smooth and efficient cutting becomes possible.

In the present embodiment, because the helix angle of the long end cutting edges 7A is larger than the helix angle of the short end cutting edges 7B, the angle α is larger than the angle θ. As a consequence, the angle formed between the tangent line of the long end cutting edges 7A in positions located apart from each other in the direction of the axis O, and the tangent line of the short end cutting edges 7B in the same positions becomes larger as these positions approach closer to the rear end in the direction of the axis O of the end mill body 1. In addition, this angle becomes equal to the angle α between the straight line C and the straight line D on a cross-section perpendicular to the axis O in the peripheral cutting edges 5A and 5B, as described above. Accordingly, chips can be discharged more smoothly compared with when, for example, this angle becomes larger in gradated steps as it approaches the rear end of the end mill body.

Moreover, by making the helix angles different between the long end cutting edges 7A and the short end cutting edges 7B, as described above, the orientation and amount of the resistance and load when the long end cutting edges 7A and the short end cutting edges 7B bite into a work piece, and the cycle of such cutting varies at each arbitrary position in the direction of the axis O. As a result, it is possible for vibrations generated in the end mill body 1 that are caused by the resistance and load which act on the long end cutting edges 7A and the short end cutting edges 7B to be made to cancel each other out. Furthermore, it is also possible to prevent chatter vibration from being generated by resonance arising in the end mill body 1. As a result, it is possible to perform high-quality cutting processing even more smoothly.

Furthermore, in the present embodiment, the short end cutting edges 7B are positioned in forward of the long end cutting edges 7A in the end mill rotation direction T, and the angle θ between the tangent line A at the inside end 7a of the long end cutting edge 7A and the tangent line B at the inside end 7b of the short end cutting edge 7B which is positioned in forward of the long end cutting edge 7A in the end mill rotation direction T is smaller than the angle α between the straight line C that connects the axis O to the peripheral cutting edge 5A which is continuous with the long end cutting edge 7A and the straight line D that connects the axis O to the peripheral cutting edge 5B which is continuous with the short end cutting edge 7B which is positioned in forward of the long end cutting edge 7A in the end mill rotation direction T. As a consequence, the interval between when the short end cutting edges 7B bite into a work piece and when the long end cutting edges 7A which are positioned in backward the short end cutting edges 7B in the end mill rotation direction T subsequently bite into the work piece is shortened.

In contrast to this, the angle β between the tangent line B at the inside end 7b of the short end cutting edge 7B, and the tangent line A' at the inside end 7a of the other long end cutting edge 7A which is positioned in forward of this short end cutting edge 7B in the end mill rotation direction T is larger than the angle θ between the tangent line A at the inside end 7a of the long end cutting edge 7A and the tangent line B at the inside end 7b of the short end cutting edge 7B which is positioned in forward of the long end cutting edge 7A in the end mill rotation direction T. Namely, the length of the cutting edge of the short end cutting edges 7B is shorter so that the load acting thereon is reduced. As a consequence, the interval between when the long end cutting edges 7A bite into a work piece and when the short end cutting edges 7B which are positioned in backward the long end cutting edges 7A in the end mill rotation direction T subsequently bite into the work piece is lengthened.

Because of this, according to the present embodiment, the quantity and size of the chips created by the long end cutting edges 7A and the short end cutting edges 7B, and also the sum total cutting resistance received from the individual end cutting edges 7 can be uniformized, so that differences between the life spans of the long end cutting edges 7A and the short end cutting edges 7B can also be uniformized. As a result, because it is possible to prevent the life span of the entire end mill body 1 from becoming shortened due to the life span of one particular end cutting edge 7 being shortened, it is possible for all of the end cutting edges 7 to be used evenly and for a prolonging of the life span of the end mill to be achieved.

In addition to this, chips that are created in uniform quantities in this manner by the long end cutting edges 7A and the short end cutting edges 7B are discharged via the chip discharge grooves 4 which are positioned in forward of the peripheral cutting edges 5A and 5B in the end mill rotation direction T. In these chip discharge grooves 4, the sizes of the angles α and γ (which relate to the groove width) between the straight lines C and D that connect together the axis O with the peripheral cutting edges 5A and 5B on a cross-section perpendicular to the axis O are the inverse of the sizes of the angles θ and β between the tangent lines A and B at the inside ends 7a and 7b of the long and short end cutting edges 7A and 7B that are continuous with these peripheral cutting edges 5A and 5B, as described above.

However, in the present embodiment, because the difference between the angles α and γ is smaller than the difference between the angles β and θ: in particular, while the difference between the angles θ and β (β−θ) is 20°, the difference between the angles α and γ (α−γ) is 10°, there are neither any extremely wide portions nor any extremely narrow portions in the groove width of the chip discharge grooves 4. Because of this, as described above, the chips that are created in uniform quantities by both the long end cutting edges 7A and the short end cutting edges 7B are discharged without causing any blockages in the chip discharge grooves 4. Accordingly, the smooth discharge of chips is further promoted, and even more efficient cutting becomes possible.

[Description of the Reference Numerals]
1 . . . End mill body
2 . . . Shank portion
3 . . . Cutting edge portion
4 . . . Chip discharge groove
5 . . . Peripheral cutting edge
5A . . . Peripheral cutting edge which is continuous with a long end cutting edge 7A
5B . . . Peripheral cutting edge which is continuous with a short end cutting edge 7B
6 . . . Gash
7 . . . End cutting edge
7A . . . Long end cutting edge
7B . . . Short end cutting edge
7a . . . Inside end of a long end cutting edge 7A
7b . . . Inside end of a short end cutting edge 7B
O . . . Axis of the end mill body 1
T . . . End mill body rotation direction
A . . . Tangent at inside end 7a of a long end cutting edge 7A as seen from the point in the direction of the axis O
B . . . Tangent at inside end 7b of a long end cutting edge 7B as seen from the point in the direction of the axis O
C . . . Straight line connecting the axis O to a peripheral cutting edge 5A on a cross-section perpendicular to the axis O
D . . . Straight line connecting the axis O to a peripheral cutting edge 5B on a cross-section that orthogonally intersects the axis O
θ . . . Angle between the tangent line A and the tangent line B which is positioned in forward of the tangent line A in the end mill rotation direction T as seen from the point in the direction of the axis O
α . . . Angle between the straight line C and the straight line D which is positioned in forward of the straight line C in the end mill rotation direction T on a cross-section perpendicular to the axis O
β . . . Angle between the tangent line B and the tangent line A which is positioned in forward of the tangent line B in the end mill rotation direction T as seen from the point in the direction of the axis O
γ . . . Angle between the straight line D and the straight line C which is positioned in forward of the straight line D in the end mill rotation direction T on a cross-section perpendicular to the axis O

What is claimed is:

1. A ball end mill comprising,
a plurality of end cutting edges being formed on a tip section of an end mill body that is rotated around an axis,
the plurality of end cutting edges being formed having, as its rotational trajectory around the axis, a hemisphere shape that is centered on the axis,
the plurality of end cutting edges being formed in such a way as to extend from the inside of the point of the tip section at intervals in a circumferential direction to the outside of a rear end of the tip section; and
a plurality of peripheral cutting edges that are continuous with outside ends of the end cutting edges and that extend to the rear end are formed at intervals in the circumferential direction on an outer circumferential portion of the end mill body;
wherein a portion of the plurality of end cutting edges is formed into long end cutting edges that extend out from the vicinity of the axis at the tip section of the end mill body;
an angle α is larger than an angle θ, the angle α on a cross-section perpendicular to the axis, being formed between a straight line that connects the axis to a peripheral cutting edge which is continuous with the long end cutting edge and a straight line that connects the axis to a peripheral cutting edge which is continuous with an end cutting edge which is positioned in forward of the long end cutting edge in the end mill rotation direction, and the angle θ, when viewed from the point in the axial direction, being formed between a tangent line at an inside end of the long end cutting edge and a tangent line at an inside end of the end cutting edge which is positioned in forward of the long end cutting edge in the end mill rotation direction,
a helix angle relative to the axis of the long end cutting edges is larger than a helix angle relative to the axis of the end cutting edges that are positioned in forward of the long end cutting edges in the end mill rotation direction; and
an angle, which is formed between the tangent line of the long end cutting edges and the tangent line of the end cutting edges, and the angle at positions on the long end cutting edges and the end cutting edges and at the same distance from the axis, becomes larger as these positions approach the rear end in the direction of the axis of the end mill body.

2. The ball end mill according to claim 1,
wherein inside ends of the end cutting edges from among the plurality of end cutting edges that are positioned in forward of the long end cutting edges in the end mill rotation direction are located further from the axis than the inside ends of the long end cutting edges, and the end cutting edges are short end cutting edges that extend from the positions to the rear end of the end mill body.

3. The ball end mill according to claim 1, wherein
the angle θ is smaller than an angle β, the angle β being between the tangent line at the inside end of the end cutting edge and the tangent line at the inside end of an other long end cutting edge which is positioned in forward of the end cutting edge in the end mill rotation direction;
the angle α is larger than an angle γ, the angle γ being between the straight line that connects the axis to the peripheral cutting edge which is continuous with the end cutting edge and a straight line that connects the axis to the peripheral cutting edge which is continuous with the other long end cutting edge which is positioned in forward of the end cutting edge in the end mill rotation direction.

4. The ball end mill according to claim 1, wherein
the long end cutting edges, the peripheral cutting edges, the end cutting edges, and the peripheral cutting edges are formed rotationally symmetrically at 180° around the axis.

5. The ball end mill according to claim 3, wherein
a size relationship between the angles θ and β is the inverse of the size relationship between the angles α and γ.

6. The ball end mill according to claim 3, wherein
the difference between the angles α and γ is smaller than the difference between the angles β and θ.

* * * * *